United States Patent
Mueller et al.

(10) Patent No.: US 10,673,962 B2
(45) Date of Patent: Jun. 2, 2020

(54) SERVICE CROSS-CONSUMPTION BASED ON AN OPEN SERVICE BROKER APPLICATION PROGRAMMING INTERFACE

(71) Applicant: SAP SE, Walldorf (DE)

(72) Inventors: Florian Mueller, Speyer (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/200,427

(22) Filed: Nov. 26, 2018

(65) Prior Publication Data
US 2019/0166209 A1 May 30, 2019

Related U.S. Application Data

(60) Provisional application No. 62/591,330, filed on Nov. 28, 2017.

(51) Int. Cl.
G06F 15/173 (2006.01)
H04L 29/08 (2006.01)
H04L 12/24 (2006.01)

(52) U.S. Cl.
CPC .......... *H04L 67/16* (2013.01); *H04L 41/5054* (2013.01); *H04L 67/2809* (2013.01); *H04L 67/2814* (2013.01); *H04L 67/2838* (2013.01)

(58) Field of Classification Search
USPC ....... 709/203, 206, 217, 219, 223, 224, 226, 709/228, 230, 232, 238; 370/254, 279; 1/1
See application file for complete search history.

(56) References Cited

U.S. PATENT DOCUMENTS

| | | |
|---|---|---|
| 7,523,142 B2 | 4/2009 | Driesen et al. |
| 7,657,575 B2 | 2/2010 | Eberlein et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,894,602 B2 | 2/2011 | Mueller et al. |
| 7,962,920 B2 | 6/2011 | Gabriel et al. |
| 7,971,209 B2 | 6/2011 | Eberlein et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,302,160 B2 | 10/2012 | Hofmann et al. |
| 8,316,422 B2 | 11/2012 | Hofmann et al. |
| 8,321,678 B2 | 11/2012 | Hofmann et al. |
| 8,356,010 B2 | 1/2013 | Driesen |

(Continued)

OTHER PUBLICATIONS

U.S. Appl. No. 14/960,983, filed Dec. 7, 2015, Eberlein, et al.

(Continued)

*Primary Examiner* — Quang N Nguyen
(74) *Attorney, Agent, or Firm* — Fish & Richardson P.C.

(57) ABSTRACT

A request is received at a service manager from a service broker proxy or a service manager aware service registry to create a service instance. Creation of a service instance is requested from a service broker. Details of the created service instance are stored within the service manager. A success or failure status is returned to the service broker proxy.

15 Claims, 8 Drawing Sheets

(56) References Cited

U.S. PATENT DOCUMENTS

| | | | |
|---|---|---|---|
| 8,375,130 B2 | 2/2013 | Eberlein et al. | |
| 8,380,667 B2 | 2/2013 | Driesen | |
| 8,392,573 B2 | 3/2013 | Lehr et al. | |
| 8,402,086 B2 | 3/2013 | Driesen et al. | |
| 8,407,297 B2 | 3/2013 | Schmidt-Karaca et al. | |
| 8,412,739 B2 | 4/2013 | Engelko et al. | |
| 8,434,060 B2 | 4/2013 | Driesen et al. | |
| 8,467,817 B2 | 6/2013 | Said et al. | |
| 8,473,942 B2 | 6/2013 | Heidel et al. | |
| 8,479,187 B2 | 7/2013 | Driesen et al. | |
| 8,543,994 B2 | 9/2013 | de Boer et al. | |
| 8,555,249 B2 | 10/2013 | Demant et al. | |
| 8,560,876 B2 | 10/2013 | Driesen et al. | |
| 8,566,784 B2 | 10/2013 | Driesen et al. | |
| 8,572,369 B2 | 10/2013 | Schmidt-Karaca et al. | |
| 8,604,973 B2 | 12/2013 | Schmidt-Karaca et al. | |
| 8,612,406 B1 | 12/2013 | Said et al. | |
| 8,645,483 B2 | 2/2014 | Odenheimer et al. | |
| 8,706,772 B2 | 4/2014 | Hartig et al. | |
| 8,751,573 B2 | 6/2014 | Said et al. | |
| 8,762,731 B2 | 6/2014 | Engler et al. | |
| 8,762,929 B2 | 6/2014 | Driesen | |
| 8,793,230 B2 | 7/2014 | Engelko et al. | |
| 8,805,986 B2 | 8/2014 | Driesen et al. | |
| 8,843,997 B1* | 9/2014 | Hare | H04L 63/0281 |
| | | | 709/225 |
| 8,850,017 B2* | 9/2014 | Ebrahimi | H04L 63/102 |
| | | | 709/226 |
| 8,868,582 B2 | 10/2014 | Fitzer et al. | |
| 8,875,122 B2 | 10/2014 | Driesen et al. | |
| 8,880,486 B2 | 11/2014 | Driesen et al. | |
| 8,924,384 B2 | 12/2014 | Driesen et al. | |
| 8,924,565 B2 | 12/2014 | Lehr et al. | |
| 8,965,957 B2* | 2/2015 | Barros | G06F 16/254 |
| | | | 709/203 |
| 8,972,934 B2 | 3/2015 | Driesen et al. | |
| 8,996,466 B2 | 3/2015 | Driesen | |
| 9,003,356 B2 | 4/2015 | Driesen et al. | |
| 9,009,105 B2 | 4/2015 | Hartig et al. | |
| 9,026,502 B2 | 5/2015 | Driesen et al. | |
| 9,026,857 B2 | 5/2015 | Becker et al. | |
| 9,031,910 B2 | 5/2015 | Driesen | |
| 9,032,406 B2 | 5/2015 | Eberlein | |
| 9,069,832 B2 | 6/2015 | Becker et al. | |
| 9,069,984 B2 | 6/2015 | Said et al. | |
| 9,077,717 B2 | 7/2015 | Said et al. | |
| 9,122,669 B2 | 9/2015 | Demant et al. | |
| 9,137,130 B2 | 9/2015 | Driesen et al. | |
| 9,182,979 B2 | 11/2015 | Odenheimer et al. | |
| 9,183,540 B2 | 11/2015 | Eberlein et al. | |
| 9,189,226 B2 | 11/2015 | Driesen et al. | |
| 9,223,985 B2 | 12/2015 | Eberlein et al. | |
| 9,229,707 B2 | 1/2016 | Borissov et al. | |
| 9,256,840 B2 | 2/2016 | Said et al. | |
| 9,262,763 B2 | 2/2016 | Peter et al. | |
| 9,274,757 B2 | 3/2016 | Said et al. | |
| 9,275,120 B2 | 6/2016 | Mayer et al. | |
| 9,724,757 B2 | 8/2017 | Barrett | |
| 9,875,273 B2 | 1/2018 | Eberlein et al. | |
| 9,935,955 B2* | 4/2018 | Desai | H04L 63/0884 |
| 9,985,953 B2* | 5/2018 | Koushik | H04L 63/0807 |
| 10,432,673 B2* | 10/2019 | Bansal | H04L 67/10 |
| 2005/0157660 A1* | 7/2005 | Mandato | H04L 29/06 |
| | | | 370/254 |
| 2007/0140150 A1* | 6/2007 | Beck | H04L 65/1069 |
| | | | 370/279 |
| 2008/0120129 A1 | 5/2008 | Seubert et al. | |
| 2010/0153341 A1 | 6/2010 | Driesen et al. | |
| 2013/0325672 A1 | 12/2013 | Odenheimer et al. | |
| 2013/0332424 A1 | 12/2013 | Nos et al. | |
| 2014/0047319 A1 | 2/2014 | Eberlein | |
| 2014/0101099 A1 | 4/2014 | Driesen et al. | |
| 2014/0108440 A1 | 4/2014 | Nos | |
| 2014/0164963 A1 | 6/2014 | Klemenz et al. | |
| 2014/0325069 A1 | 10/2014 | Odenheimer et al. | |
| 2014/0359594 A1 | 12/2014 | Erbe et al. | |
| 2014/0379677 A1 | 12/2014 | Driesen et al. | |
| 2015/0006608 A1 | 1/2015 | Eberlein et al. | |
| 2015/0100546 A1 | 4/2015 | Eberlein et al. | |
| 2015/0178332 A1 | 6/2015 | Said et al. | |
| 2017/0025441 A1 | 1/2017 | Mori | |

OTHER PUBLICATIONS

U.S. Appl. No. 15/083,918, filed Mar. 29, 2016, Eberlein, et al.
U.S. Appl. No. 15/087,677, filed Mar. 31, 2016, Eberlein, et al.
U.S. Appl. No. 15/356,190, filed Nov. 18, 2016, Eberlein.
U.S. Appl. No. 15/581,459, filed Apr. 28, 2017, Eberlein, et al.
U.S. Appl. No. 15/593,830, filed May 12, 2017, Eberlein, et al.
U.S. Appl. No. 15/847,627, filed Dec. 19, 2017, de Boer, et al.
U.S. Appl. No. 15/970,499, filed May 3, 2018, Eberlein, et al.
U.S. Appl. No. 16/173,225, filed Oct. 29, 2018, Eberlein, et al.

* cited by examiner

SERVICE CROSS-CONSUMPTION BASED ON AN OPEN SERVICE BROKER APPLICATION PROGRAMMING INTERFACE

CLAIM OF PRIORITY

This application claims priority under 35 USC § 119(e) to U.S. Patent Application Ser. No. 62/591,330, filed on Nov. 28, 2017, the entire contents of which are hereby incorporated by reference.

BACKGROUND

Cloud software applications (or "applications") are usually using services exposed by the environment they are running in, although the services themselves may be running outside of the environment. The services range from low-level services such as a file system to high-level domain specific business services. Management, monitoring, and maintenance of services are not the responsibility of the application but of the service provider. The service provider may be the provider of the environment or a third party. Services may run in the same or another type of environment as the application or somewhere else, outside of any of the provided environments. To show up in a service catalog of a particular environment, the service can be registered with the particular environment. Cloud providers that host many environments (for example, hundreds or thousands) may encounter issues with: 1) sets of services being available in all or in a subset of the environments and 2) application parts spanned across multiple environments of the same or different types requiring access to the same service instances.

SUMMARY

The present disclosure describes service cross-consumption based on an open service broker application-programming interface (API).

In an implementation, a request is received at a service manager from a service broker proxy or a service manager aware service registry to create a service instance. Creation of a service instance is requested from a service broker. Details of the created service instance are stored within the service manager. A success or failure status is returned to the service broker proxy.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the described solution simplifies management of services and service instances in scenarios with many environments. Second, because a described service manager is not bound to a specific environment and uses an open API to avoid an environment lock-in. The configuration permits expansion of and central application of environment independent policies for use with future environments. Third, in many environments (for example, those that support the open API), the described solution is transparent. In the many environments, native tools will work without or with little modification and service-related workflows do not need to be changed. Fourth, most environment vendors/communities focus on services infrastructure within their particular spaces. There is no expectation that the vendors/communities will create a solution that works across environments.

The details of one or more implementations of the subject matter of this specification are set forth in the detailed description, the claims, and the accompanying drawings. Other features, aspects, and advantages of the subject matter will become apparent to those of ordinary skill in the art from the detailed description, the claims, and the accompanying drawings.

DESCRIPTION OF DRAWINGS

Like reference numbers and designations in the various drawings indicate like elements.

DETAILED DESCRIPTION

Figure 1:
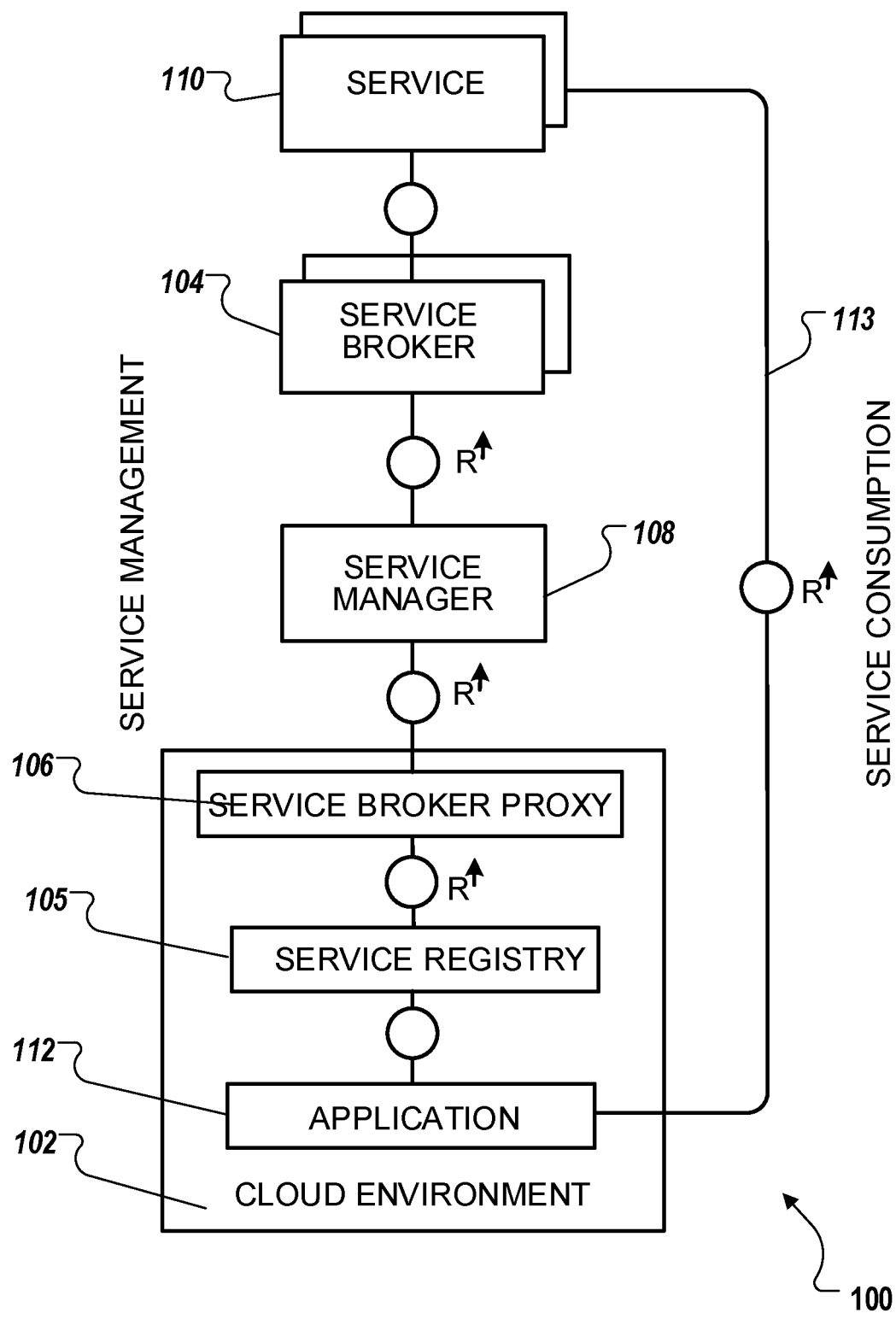
FIG. 1 is a block diagram illustrating a cloud controller calling a service broker using a service broker proxy and a service manager, according to an implementation of the present disclosure.

The following detailed description describes service cross-consumption based on an open service broker application-programming interface (API), and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Cloud software applications (or "applications") are usually using services exposed by the environment they are running in, although the services themselves may be running outside of the environment. The services can range from low-level services such as a file system to high-level domain specific business services. Management, monitoring, and maintenance of services are not the responsibility of an application but of the service provider. The service provider may be the provider of the environment or a third party. Services may run in the same or another type of environment as the application or somewhere else, outside of any of the provided environments. To show up in a service catalog associated with an environment, the service can be registered at the environment.

Cloud providers that host many environments (for example, hundreds or thousands) may encounter a plurality of issues. In some implementations, one possible issue could be that a set of services is required to be available in all or a subset of the environments. Adding or removing a service can require a registration or deregistration in a corresponding plurality of environments. The registration or deregistration is not just a complicated and tedious management task; but can be associated with a risk of ending up in an inconsistent state with respect to the plurality of environments. The registration or deregistration can also present additional difficulties and issues if some environments are not under full control of a particular cloud provider.

Because not all environments and all types of environments are suited equally for all tasks, an application developer might span an application across multiple environments of the same type or of a different type. In some implementations, the different parts of the application would not only require access to the same services, but also to the same service instances. The access requirement can be especially important for services that persist data. Environments can be self-contained and can lack the means to address at least the described issues.

A technique of moving a responsibility of managing services to a central component (a "service manager") outside of any spanning environments is described. Service brokers are registered and deregistered at the service manager. For each environment, a particular component (a "service broker proxy") performs the steps to replicate service changes in an environment-specific manner within its particular environment.

A described technique is based on the open service broker API, an open standard for provisioning and de-provisioning service instances and binding service instances to applications. The open service broker (OSB) API project allows developers, independent software vendors (ISVs), and software-as-a-service (SaaS) vendors a single, simple, and elegant way to deliver services to applications running within cloud native platforms, such as CLOUD FOUNDRY®, OPENSHIFT®, KUBERNETES®, or others. The described solution includes the advantages of standardization and wide adoption.

The OSB specification defines an API to be implemented by a service broker. A service broker is associated to each service that can become a part of the services infrastructure of an environment. The OSB API allows an environment to programmatically discover services and to create and delete service instances and to bind and unbind service instances. The standardization enables environments to handle all types of services without knowing details of a particular service. Environments that do not support OSB, can be enhanced to work with the described OSB service brokers.

Conventionally, service brokers are registered at the environment. The component responsible for the registration and handling the lifecycle of service instances and bindings is called a "services registry." For example, in CLOUD FOUNDRY®, the registration responsibility is assigned to a cloud controller component. In KUBERNETES®, the registration responsibility is assigned to a service catalog component.

A service registry can communicate directly to registered service brokers. The model might not be configured to scale if a cloud provider manages different types of environments that share services and service brokers.

Depending on the type of environment, many environment instances may also exist. For example, a KUBERNETES® infrastructure may consist of hundreds of clusters that each have their own service registry. Adding a new service can require the registration in all environments, which may not be possible if an environment is not fully controlled by the cloud provider.

In some implementations, the service brokers are registered only once at the service manager. An environment-type-specific service broker proxy exists for each environment. In some implementations, the service broker proxy may reside in an environment, outside the environment, or may be an integral part of the service manager. The service broker proxy can replicate the changes in the service manager into the environment. The one service broker proxy instance per environment is the substitute for all service brokers at the service manager.

In some implementations, are at least two options can be used to accomplished registration replication at the environment.

One option is to add or remove a service broker to or from the service manager, in response to the service broker proxy registering or deregistering itself, respectively, at the local service registry for the respective service broker. The communication about the changes between the service manager and service broker proxy can be based on a messaging infrastructure. In some instances, depending on the configuration, the service manager may push changes to the service broker proxies (for example, by using the mentioned messaging infrastructure) or the service broker proxies may pull the changes (for example, in regular intervals, using long polling, on demand, or a mixture of push and pull).

Another option is to use a service broker proxy that represents all service brokers that are registered at the service manager at once. The service broker proxy can dynamically merge the service catalogs of all service brokers into one service catalog. If a service broker is added, the service catalog grows; if a service broker is removed, the service catalog shrinks. Whenever the local service registry requests the service catalog from the service broker proxy, the current state of all service brokers, services, and service plans is returned as one, single service catalog.

In some implementations, both options can be combined. For example, service brokers can be managed as broker groups. The service broker proxy can be registered at the local cloud controller by broker group. The service catalog associated with a broker group would contain the service catalogs of all service brokers in the broker group.

Because the service brokers are not directly attached to the environments, the service broker proxy assumes the role by-proxy. In some implementations, only one instance of the service broker proxy is available per environment, but it might be registered multiple times (see previous option 1). The local service registry can be configured to communicate with the service broker proxy as if communicating with the service broker. For example, the local service registry might not detect that it is not actually communicating with the service broker during the communication with the service broker proxy. The OSB API can make the service broker proxy indistinguishable from the original service broker.

The service broker proxy forwards requests (for example, a create service instance request) to the service manager. The service broker proxy adds to the request (for example, the service broker proxy indicates the service broker corresponding to a particular request and the environment that triggered the request).

In some implementations, the protocol used to communicate with the service manager could be the OSB API or other protocol. Assuming the role of a global service registry, the service manager can forward the request to the target service broker, which processes the request and associated operations. The result of the request can be pushed down the communication chain back to the local service registry. Depending on the request, the service manager may store metadata. For example, whenever a new service instance has been created, it may store the service instance identification (ID) used in the environment.

FIG. 1 is a block diagram 100 illustrating a cloud controller 102 calling a service broker 104 using a service registry 105/service broker proxy 106 and a service manager 108, according to an implementation of the present disclosure. FIG. 1 is a simplification of the management of services 110 and service brokers (for example, 104). The service manager (for example, 108) can be configured to collect data about a dependency graph and usage of services, which can help to administer and optimize the infrastructure of services. In response to registering the service 110, the application 112 communicates directly with the service 110 using communication 113.

Figure 2:
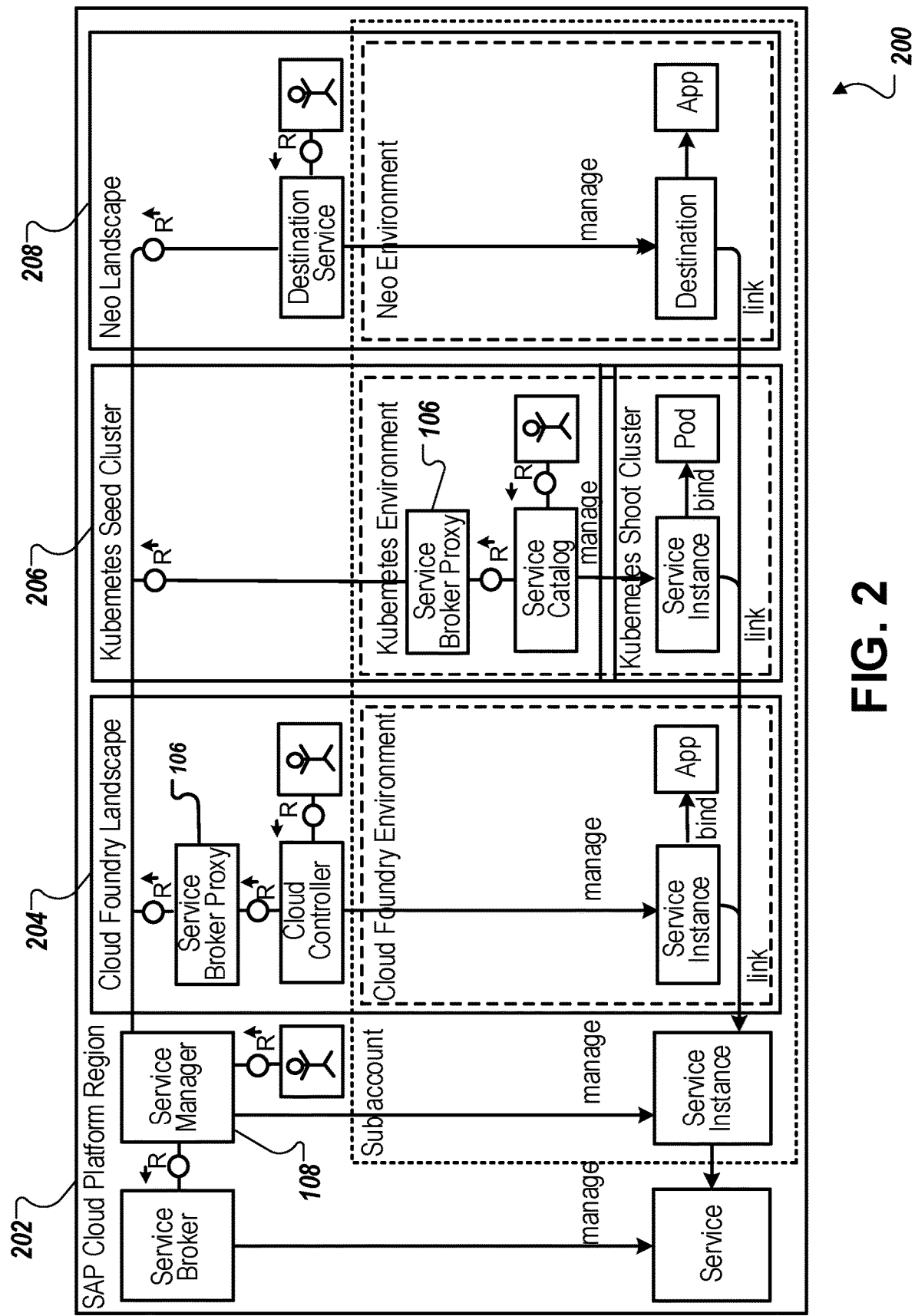
FIG. 2 is a block diagram illustrating an example of the service manager and service broker proxies with three different types of environments, according to an implementation of the present disclosure.

FIG. 2 is a block diagram 200 illustrating an example of the service manager 108 and service broker proxies 106 with three different types of environments (for example, SAP CLOUD PLATFORM® 202 working with the CLOUD FOUNDARY® 204, KUBEMETES® 206, and NEO® 208 environments), according to an implementation of the present disclosure. In some implementations, the block diagram 200 can be implemented in other environments (for example, ABAP®).

The block diagram 200 can be configured to perform service instance sharing.

Applications that span multiple environments may require access to the same service instance (that is, service instance sharing). For example, a front-end part of an application in one environment can collect data and a back-end part of the application in a second environment can processes the data. Both application parts can require access to the same data store.

Conventionally, a service instance is created in one of the environments. The created service instance is only known by the corresponding environment. There are manual ways to give the application part of another environment access to the service instances, but there is no environment or infrastructure support for handling implicit dependencies introduced in this manner, which may turn into a lifecycle management problem requiring inefficient use of resources. In some implementations, a solution for the lifecycle management problem can include the following considerations.

The service manager 108 can track and store data associated to the service instances based on create and delete operations that go through the service manager 108. The functionality could be, but is not limited to, a service broker ID, a service ID, a plan ID, a service instance ID, parameters, and context. That is, the service manager 108 acquires data about all service instances and where they are used.

For services that allow service instance sharing, the service manager 108 adds a reference service plan to the service catalog of the service broker 104. That is, the service broker proxies provide a service catalog to environments that contain an additional service plan, which does not exist in the service catalog of the original service broker 104. The service plan can be used to reference an existing service instance.

In response to an environment creating an instance of the service plan, the environment provides an ID associated the existing service instance (a service instance ID), for example as a parameter. The service manager 108 identifies the parameter as a reference and all requests referring to the new service instance are mapped to the existing service instance using the ID. Whenever a call to a service broker 104 with the new service instance ID arrives, the service manager 108 replaces the service instance ID with the original service instance ID before it calls a target service broker 104.

For an additional environment, the configuration is presented as a new service instance that belongs to the additional environment. The environments can support a new service instance without a modification to the environments being required.

An advantage of having a reference plan is that the original service instance can change its service plan during its lifecycle without notifying or adapting the references.

The service manager 108 can store information about the bindings. Similar to the service instances, all binding creations and deletions pass through the service manager 108. The service manager 108 can acquire data about all bindings and where they are used. The data can be useful, for example, to cleanly unbind all applications of an environment that have been shut down. Although, operations associated to bindings may be uncommon in production environments, it might happen in development environments.

The service manager 108 can also perform referencing counting. For example, deletion of the original service instance may be prohibited as long as there are references to that particular service instance. If the service manager 108 stores binding data, the data can also be used to decide if a service instance can be deleted. Different strategies can be used to manage service instance deletions. The strategies may vary depending on how and where a service instance was initially created and whether there are still bindings to the service instance.

Service brokers 104 may indicate on a per service broker, per service, or per service plan basis if service instance sharing can be allowed. The configuration can be expressed, for example, in the service and service plan metadata in the service catalog provided by the service broker 104.

Service instances may themselves indicate whether sharing of the service instance is allowed in the response of a service instance-provisioning request. If neither the service broker 104 nor the service instance indicates if sharing is allowed, the service manager 108 may have configurable default values.

In some use cases, not all services, service plans, and service instances can be available to all environments. The service manager 108 may filter the services, service plans, and service instances that it provides to an environment. A filter may be backed by configured rules that take technical, organizational, and commercial aspects into account (for example, only offer services that a user is entitled to for use). In some implementations, service brokers 104 are not visible in the environments.

Several OSB requests can contain a context object. The context object transports information about the requester. The context object does not have a defined structure. Each environment can provide whatever structure and data necessary. In some implementations, service brokers 104 may not use the context data, but the service brokers 104 that do, can require data indicating each environment, what to expect, and how to interpret data.

The service manager 108 can exchange or modify the context object before it forwards an associated request to the target service broker 104. For example, it may add an identifier for each environment because the service broker 104 may now be used by multiple environments and there is no other indication as to which environment is calling.

If a service instance is shared by multiple environments, multiple contexts are associated to a service instance. For example, for the generation of a service instance, there is the context of the environment that created the service instance and potentially an additional service manager context. In response to generating a reference to an existing service instance, the service manager 108 may send a service instance update request to the service broker 104. The service instance update request can contain a context object that holds the new additional context and may also contain an updated service manager context.

The service manager 108 can provide a management API that goes beyond the OSB API. In some implementations, the management API can cover a plurality of functionalities.

A functionality can include register and deregister service brokers 104. Other information such as the purpose of the service broker 104 (for example, development or production), the registration time and the registrar, or network details of the service might be attached to the registration.

Another functionality can include listing all registered service brokers 104 and get information about the service brokers 104. Another functionality can include updating details associated with a service broker 104. The update functionality of the service broker details include at least the service broker URL and the service broker credentials. Additional details can be associated to service broker configurations. For example, there could be a switch that defines whether service instance sharing is allowed for a particular service broker 104. Another functionality can include listing service instances and retrieving information about service instances. Another functionality can include listing bindings and retrieving information about bindings (that is, if binding data is stored). Another functionality can include listing service instance references and get information about service instance references. Another functionality can include forcing update and deletion of service instances, bindings, and service instance references. For example, the update and deletion of service instances can be required when a service broker 104 disappears and service manager database needs to be corrected. Another functionality can include operations to handle orphan service instances and bindings (as according to the OSB specification). Another functionality can include retrieval of information about ongoing asynchronous operations. Another functionality can include management of authentication and authorization. Another functionality can include operations to generate and/or manage credentials for service broker proxies. Other information such as the type of environment, the purpose of the environment (for example, development, staging, and production), the creation time and the creator of the credentials, or billing information might be attached to the credentials. Another functionality can include management of configuration and default values. For example, the default value for a switch can define whether service instance sharing is allowed or not. Another functionality can include enablement of filters to expose the corresponding APIs that might be necessary to configure the filters.

Additionally, all functions of the OSB API can be available for managing the system (for example, provisioning and de-provisioning service instances are management tasks). The service manager 108 may use the API defined in the OSB specification or define a different API that provides feature parity with the OSB API. In some implementations, the management API can only allow access to authenticated users. Depending on the user and their role (for example, system administrator, broker administrator, instance administrator, and supporter), some functions may be restricted or not available at all.

Figure 3:
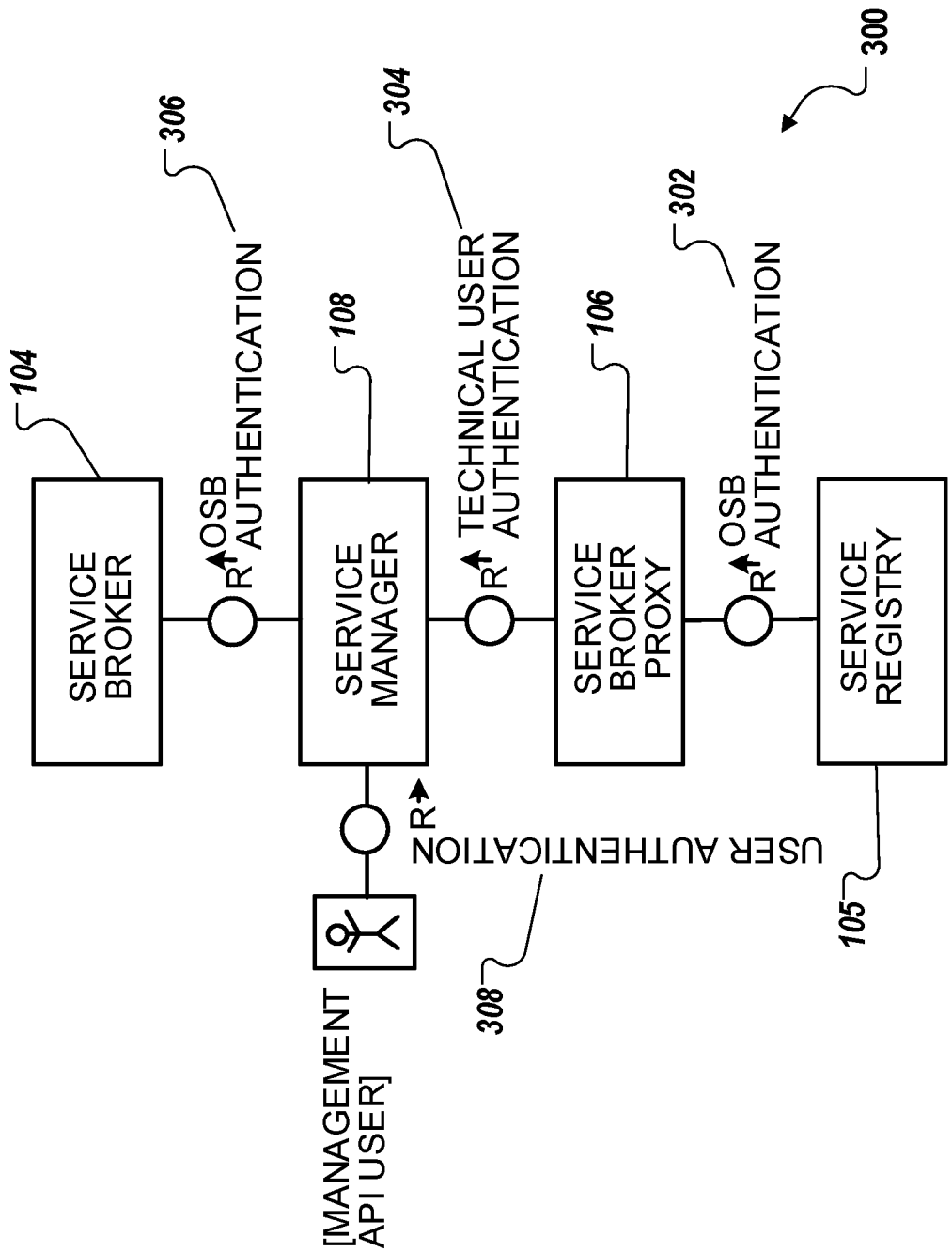
FIG. 3 is a block diagram illustrating required authentication areas, according to an implementation of the present disclosure.

FIG. 3 is a block diagram illustrating required authentication areas, according to an implementation of the present disclosure. In some implementations, there are four areas where authentication is required: connections 302 from the service registry 105 to the service broker proxy 106, connections 304 from the service broker proxy 106 to the service manager 108, connections 306 from the service manager 108 to the service brokers 104, and management calls 308 to the service manager 108.

The authentication at the connections 302 from the service registry 105 to the service broker proxy 106 can be defined by the OSB specification. The service broker proxy 106 can provide and store the credentials in an environmentally-typical form.

The authentication at the connections 304 from the service broker proxy 106 to the service manager 108 can be independent of the OSB specification and can be anything, for example a technical user using basic authentication or a transport layer security (TLS) client certificate. The authentication at the connections 304 is a technical and not a user-based authentication. The credentials on the service broker proxy 106 side should be deployed together with the service broker proxy 106 and securely stored. The capabilities of the environment may be leveraged to do so. For example, in KUBERNETES® the credentials could be stored in a secret. The credentials may be exchanged from time to time.

The authentication at the connections 306 from the service manager 108 to the service brokers 104 can be defined by the OSB specification. The credentials of the service broker 104 are supplied during the registration of the service broker 104 at the service manager 108. Credential update and rotation should be possible.

The authentication associated with the management calls 308 to the service manager 108 can be any user-based authentication. For example, authentication associated with the management calls 308 can include registering service brokers 104 and listing service instances 110 (see FIG. 1). The authentication associated with the management calls 308 can be a user-based authentication because different users may have different permissions to manage the system. The user management may be part of the service manager 108. In some implementations, the authentication can be delegated to a central user management system (not illustrated) that often exists within a cloud platform.

The service manager 108 can be a central, important, and sensitive component in a cloud computing environment.

Multiple groups of people can manage different parts of the cloud computing environment and the service manager 108. Some authorization checks can happen directly in the service manager 108. Some checks can be performed with filters. In some implementations, authorization checks can depend on different needs and requirements associated to each cloud provider. Accordingly, the service manager 108 concept does not prescribe a particular authorization model. The service manager 108 can include a plurality of filters.

The service manager 108 can include a user accessibly filter that defines which environments, service brokers 104, services 110, service plans, and service instances a management API user and role is allowed to access and change.

The service manager 108 can include a broker filter that defines which service broker 104 is visible to which environment. The broker filter is in charge of sending the right set of service brokers 104 to service broker proxies 106 when requested.

The service manager 108 can include a catalog filter that defines which services and plans are visible to which environment. Depending on the environment and the service broker 104, it modifies the catalog of the service broker 104 when the service broker proxies 106 ask for it. If a service broker 104 was marked as a development service broker 104, it also modifies the service and plan IDs to avoid collisions with other variants of the service broker 104 registered by other developers.

The service manager 108 can include an instance filter that adds an instance-sharing plan to all services that allow service instance sharing. The instance filter can ensure that service instances are only shared between environments that are configured to do so.

All filters may be backed by rules, static configuration, and input from external systems, which may be cached.

An example system might have a plurality of roles, where a particular user might have one or more roles.

A system role can include system administrator role that enables access to everything and is usually used to keep the service manager 108 running, not to maintain configurations. The user accessibly filter allows access to everything.

Another system role can include broker administrator role that can register and deregister service brokers 104. A user with the broker administrator role can only see the environments that they are entitled to (for example, a super set of the environments they can register and deregister service brokers 104 for). A user may also see all or a subset of already registered service brokers 104 and make services managed by the service brokers 104 visible or invisible to their environments. The user also can select which services and service plans (including reference plans) are provided to which environment. The configurations may be stored in static tables or as a set of rules. A broker administrator may have no access to service instances. The user accessibly filter is in charge of the visibility. The broker filter is responsible for storing and applying a service broker configuration. The catalog filter manages the service and plan configuration. Another system role can include an instance administrator role that manages which service instance can be reused by which environment. A user with the instance administrator role can only see the environments and service instances that they are entitled to (for example, a super set of the environments they can change service instance configurations for). The configurations may be stored in static tables or as a set of rules. An instance administrator may not register, deregister, or change service brokers 104. The user accessibly filter is in charge of the visibility. The instance filter is responsible for storing and applying the service instance configurations.

Supporter—A support user may receive temporary access to all aspects of an environment. That is, for a limited time they are the broker administrator and instance administrator for a set of environments.

In some implementations, an application can only use a service if it is possible to create a network connection from the application to the service. Some services are publicly available, but some services may live on a private network and a tunnel between the application and the service is requested to be established.

The described service manager 108 may play an important role in setting up the tunnel. The service manager 108 includes data associated to the service and application and when such a tunnel is requested to be opened (such as, during bind) and closed (such as, during unbind). In some implementations, the tunnel may be created by the service manager 108 or another component that is triggered by the service manager 108. The details can depend on the infrastructure on both ends and are not discussed in the instant application.

The application and the service broker proxy 106 can be included in the same environment. If the environment requires reconfiguration to establish a tunnel (for example, changing firewall rules or security groups), the service broker proxy 106 may be configured to perform the reconfiguration. The service manager 108 may provide the technical details as part of the binding and unbinding call response. The details can be removed from the response before it is forwarded to a local service registry 105. Another way to achieve the functionality is having an agent in the application environments. The tunnel can be established by the service manager 108 or the responsible component sends the details to the agent, which then takes the required steps to establish the tunnel. The details and the protocol for the functionality are not discussed in the instant application.

The service side of the connection can be complicated. The service manager 108 may provide the technical details of the tunnel in the bind request, for example as an extension of the context object. Service brokers 104 can assist with setting up the tunnel. The in some implementations, only specialized service brokers 104 can handle a setup that is outside the OSB specification. A described agent can provide a workaround. Such an agent resides in all service environments, which are not publically accessible. The agent gets its commands from the service manager 108 or the responsible component. The service manager 108 requires data indicating the environment the service resides. That might be provided by an administrator when the service broker 104 is registered at a service manager 108.

The described method and system can be extended in several ways. For example, service broker proxies 106 can replicate and store certain information to avoid round-trips to the service manager 108 or to communicate with a service broker 104 directly. The extension for replication can optimize network traffic and enhance the availability of the solution.

Terminology used in this document is provided in Table 1. Note, as will be understood by those of ordinary skill in the art, that some aspects may have different names in some environments.

TABLE 1

| | |
|---|---|
| Cloud Provider | An entity running one or more environments. |
| Environment | A runtime environment for applications and services. Examples are CLOUD FOUNDRY and KUBERNETES. The term in the Open Service Broker specification for environment is "platform". |
| Service Registry | A component of the environment that is, amongst other things, responsible for managing service instances and service bindings. |
| Cloud application | An application running in a Cloud Environment. Often, applications provide web interfaces for end-users and APIs that can be consumed by other cloud and non-cloud applications such as mobile applications. Applications may consist of multiple parts (sometimes called "micro services") that run in one or multiple environments. |
| Service Catalog | A list of services and services plans that are registered at an environment. |
| Service | A managed software offering that provides a functionally, often through an API. |
| Service Plan | The representation of the costs and benefits for a given variant of the service. |
| Service Broker | An entity that manages the lifecycle of service instances. The API is defined by the Open Service Broker specification. |
| Service Instance | An instantiation of a service offering. |
| Service Binding | The representation of an association between an application and a service instance. |
| Service Provider | An entity proving a service offering. |
| Service Manager | An environment independent implementation of a service registry, see above. |

Figure 4:
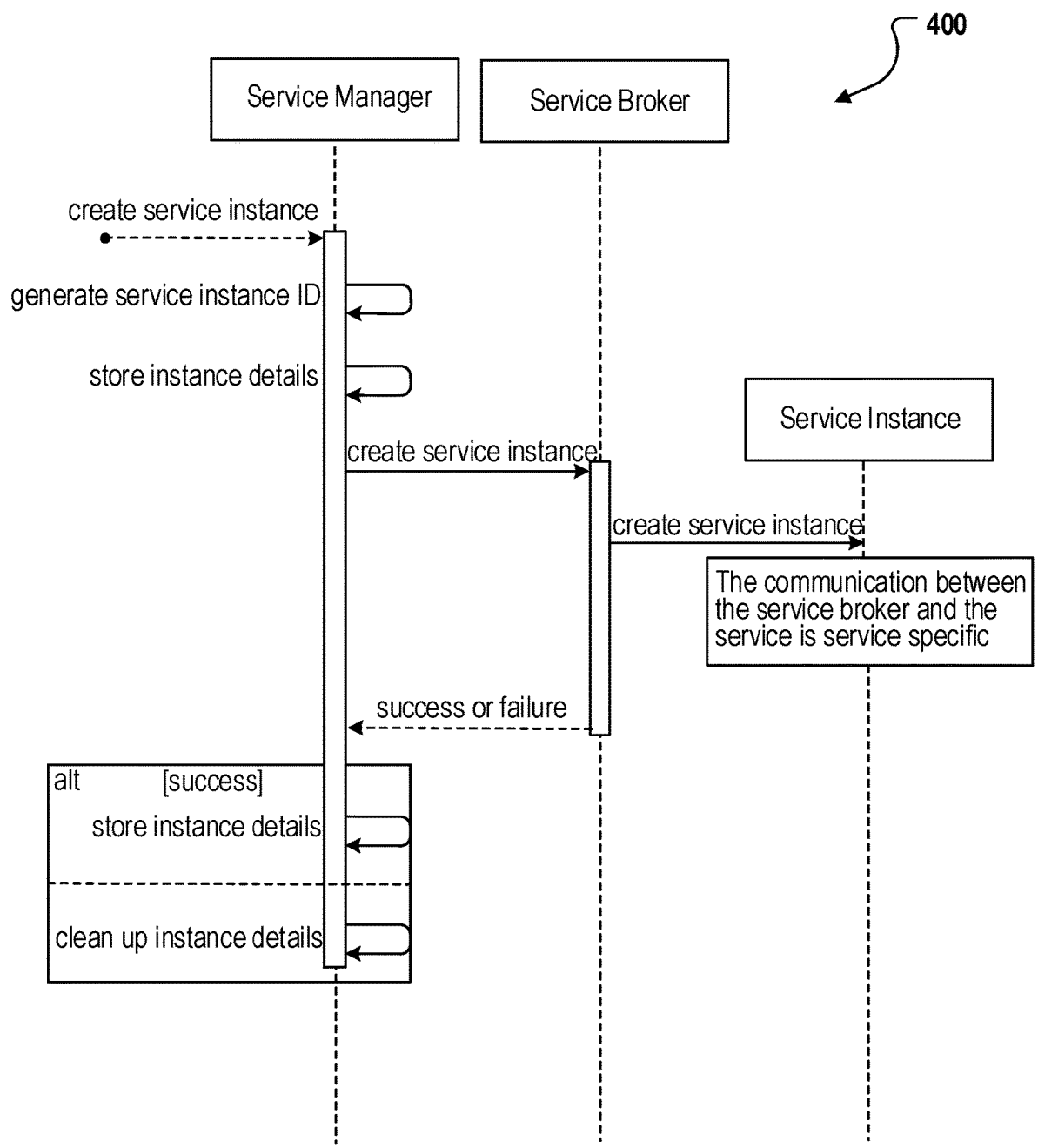
FIG. 4 is a swim diagram of a method for creating a service instance at the service manager, according to an implementation of the present disclosure.

FIG. 4 is a swim diagram of a method 400 for creating a service instance at the service manager 108, according to an implementation of the present disclosure. Method 400 provides provisioning service instances at the service manager 108. De-provisioning a service instance generally follows steps similar to the illustrated method 400. The open service broker API also supports asynchronous provisioning of service instances, which adds a few additional steps. The steps can follow the same pattern using the service manager 108 to the servicer broker.

Figure 5:
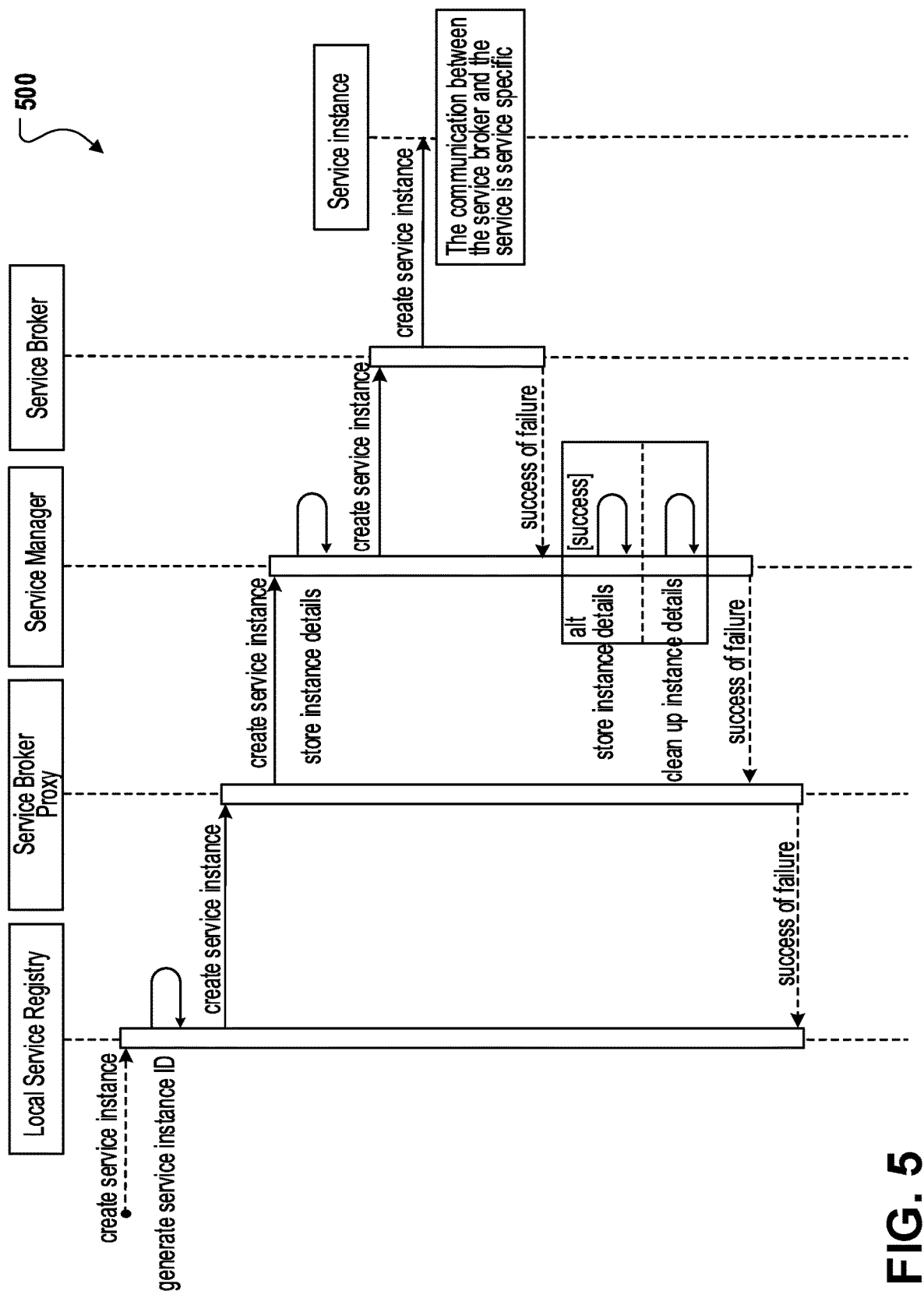
FIG. 5 is a swim diagram of a method for creating a service instance from within an environment, according to an implementation of the present disclosure.

FIG. 5 is a swim diagram of a method 500 for creating a service instance from within an environment, according to an implementation of the present disclosure. Method 500 provides provisioning a service instance from within an environment. For example, method 500 can include a plurality of operations performed by a local service registry 105, a service broker proxy 106, a service manager 108, and a service broker 104. The local service registry 105 can receive a request to create a service instance. The local service registry 105 can generate a service instance identifier. The local service registry 105 can transmit the request to create the service instance to the service broker proxy 106, which transmits the request to the service manager 108. The service manager 108 can store the instance details and transmit the request to the service broker 104 that can generate the service instance such that the communication between the service broker 104 and the service is service specific. Results indicating the success or failure of the service instance generation process can be transmitted to the service manager 108 that sends it to the service broker proxy 106 that transmits it to the local service registry 105. De-provisioning a service instance generally follows steps similar to method 500.

The open service broker API can support asynchronous provisioning of service instances, which adds a few additional steps. The steps can follow the same pattern using the service broker proxy 106 and the service manager 108 to the servicer broker 104.

Figure 6:
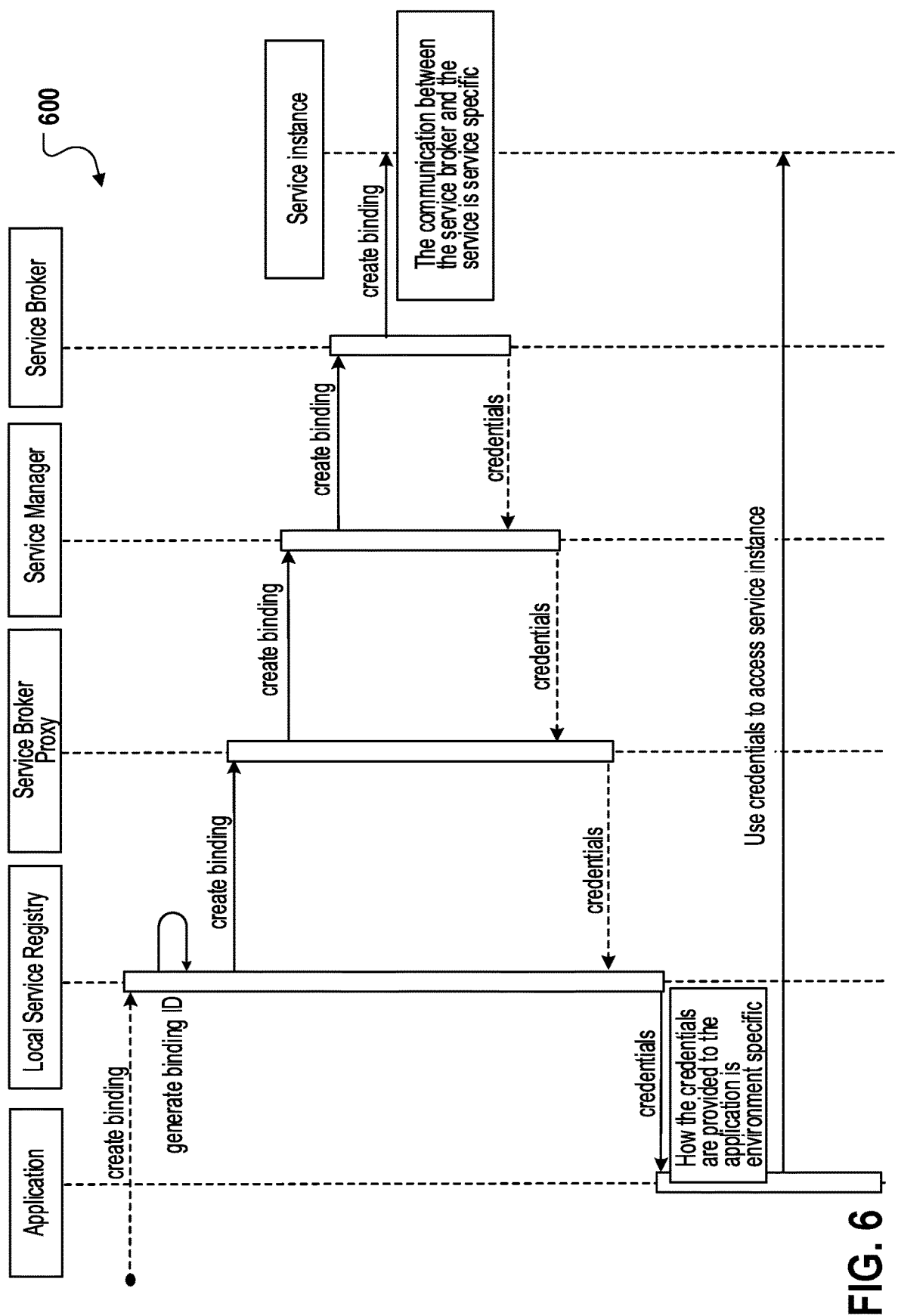
FIG. 6 is a swim diagram of a method for binding a service instance to an application, according to an implementation of the present disclosure.

FIG. 6 is a swim diagram of a method 600 for binding a service instance to an application, according to an implementation of the present disclosure. Method 600 provides binding for a service instance to an application. For example, method 600 can include a plurality of operations performed by an application, a local service registry 105, a service broker proxy 106, a service manager 108, and a service broker 104. The application can receive a request to create binding for a service instance. The application can transmit the request to the local service registry 105. The local service registry 105 can generate a binding identifier. The local service registry 105 can transmit the request to create the binding to the service broker proxy 106, which transmits the request to the service manager 108. The service manager 108 can store the binding details and transmit the request to the service broker 104 that can generate the binding such that the communication between the service broker 104 and the service is service specific. Results indicating the success or failure of the binding of the service instance generation process can be transmitted to the service manager 108 that sends it to the service broker proxy 106 that transmits it to the local service registry 105. In some implementations, the open service broker API can be configured to support asynchronous binding of service instances. While not explicitly enumerated, the additional configuration can result in the addition of a few additional steps following a similar pattern to that of using the service manager 108 with the servicer broker. These steps should be apparent to those of ordinary skill in the art. Un-binding a service instance from an application generally follows steps similar to method 600.

Figure 7:
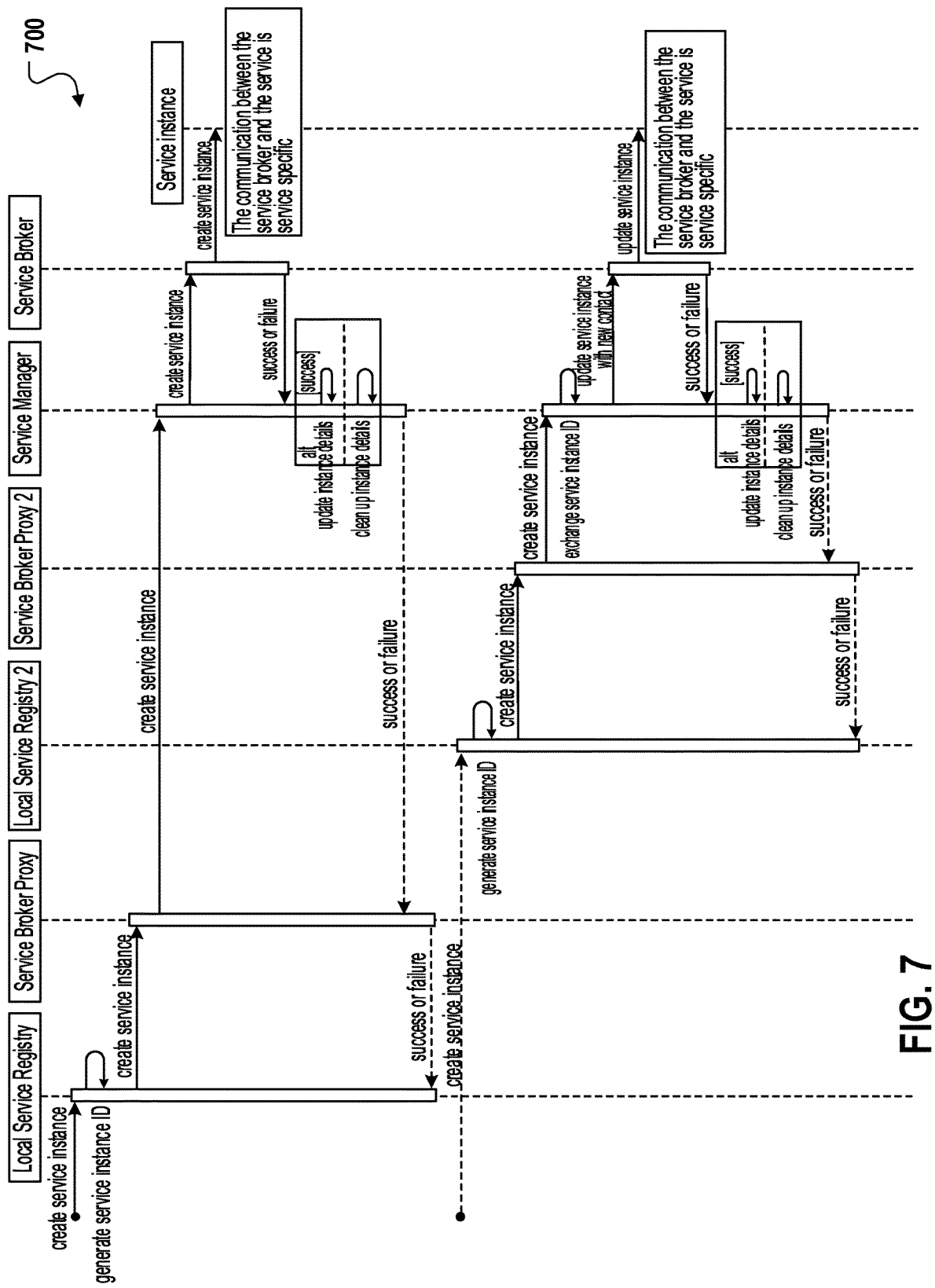
FIG. 7 is a swim diagram of a method for sharing a service instance between two environments, according to an implementation of the present disclosure.

FIG. 7 is a swim diagram of a method 700 for sharing a service instance between two environments, according to an implementation of the present disclosure. Method 700 provides sharing a service instance between two environments. For example, method 700 can include a plurality of operations performed by a local service registry 1, a service broker proxy 1, a local service registry 2, a service broker proxy 2, a service manager 108, and a service broker. The local service registry 1 can receive a request to create a service instance. The local service registry 1 can generate a service instance identifier. The local service registry 1 can transmit the request to create the service instance to the service broker proxy 1, which transmits the request to the service manager 108. The local service registry 2 can receive a request to create a service instance. The local service registry 2 can generate a service instance identifier. The local service registry 2 can transmit the request to create the service instance to the service broker proxy 2, which transmits the request to the service manager 108. The service manager 108 can store the instance details and transmit the request to the service broker that can generate the service instance such that the communication between the service broker and the service is service specific. Results indicating the success or failure of the service instance generation process can be transmitted to the service manager 108 that sends it to the respective service broker proxy 1 or 2 that transmits it to the respective local service registry 1 or 2. Un-sharing a service instance between two environments generally follows steps similar to method 700. Note that in FIG. 7, local service registry 1/local service registry 2 may be the same and service broker proxy 1/service broker proxy 2 may be the same. In some implementations, the service instance is shared between two spaces in the same environment.

Figure 8:
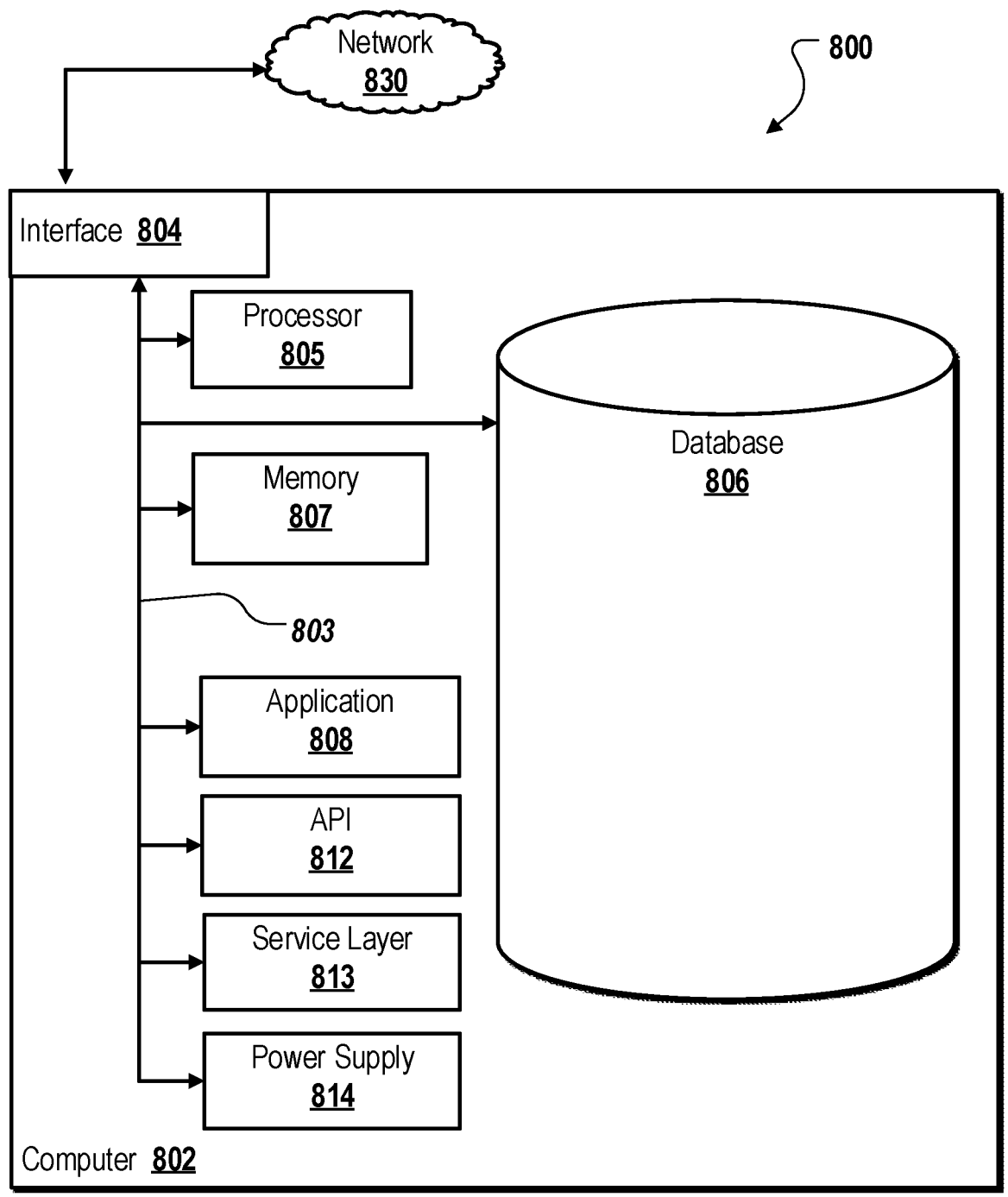
FIG. 8 is a block diagram illustrating an example of a computer-implemented system used to provide computational functionalities associated with described algorithms, methods, functions, processes, flows, and procedures, according to an implementation of the present disclosure.

FIG. 8 is a block diagram illustrating an example of a computer-implemented System 800 used to provide computational functionalities associated with described algorithms, methods, functions, processes, flows, and procedures, according to an implementation of the present disclosure. In the illustrated implementation, System 800 includes a Computer 802 and a Network 830.

The illustrated Computer 802 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 802 can include an input device, such as a keypad, keyboard, touch screen, another input device, or a combination of input devices that can accept user information, and an output device that conveys information associated with the operation of the Computer 802, including digital data, visual, audio, another type of information, or a combination of types of information, on a graphical-type user interface (UI) (or GUI) or other UI.

The Computer 802 can serve in a role in a distributed computing system as a client, network component, a server, a database or another persistency, another role, or a combination of roles for performing the subject matter described in the present disclosure. The illustrated Computer 802 is communicably coupled with a Network 830. In some implementations, one or more components of the Computer 802 can be configured to operate within an environment, including cloud-computing-based, local, global, another environment, or a combination of environments.

At a high level, the Computer 802 is an electronic computing device operable to receive, transmit, process, store, or manage data and information associated with the described subject matter. According to some implementations, the Computer 802 can also include or be communicably coupled with a server, including an application server, e-mail server, web server, caching server, streaming data server, another server, or a combination of servers.

The Computer 802 can receive requests over Network 830 (for example, from a client software application executing on another Computer 802) and respond to the received requests by processing the received requests using a software application or a combination of software applications. In addition, requests can also be sent to the Computer 802 from internal users (for example, from a command console or by another internal access method), external or third-parties, or other entities, individuals, systems, or computers.

Each of the components of the Computer 802 can communicate using a System Bus 803. In some implementations, any or all of the components of the Computer 802, including hardware, software, or a combination of hardware and software, can interface over the System Bus 803 using an application-programming interface (API) 812, a Service Layer 813, or a combination of the API 812 and Service Layer 813. The API 812 can include specifications for routines, data structures, and object classes. The API 812 can be either computer-language independent or dependent and refer to a complete interface, a single function, or even a set of APIs. The Service Layer 813 provides software services to the Computer 802 or other components (whether illustrated or not) that are communicably coupled to the Computer 802. The functionality of the Computer 802 can be accessible for all service consumers using the Service Layer 813. Software services, such as those provided by the Service Layer 813, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 802, alternative implementations can illustrate the API 812 or the Service Layer 813 as stand-alone components in relation to other components of the Computer 802 or other components (whether illustrated or not) that are communicably coupled to the Computer 802. Moreover, any or all parts of the API 812 or the Service Layer 813 can be implemented as a child or a sub-module of another software module, enterprise application, or hardware module without departing from the scope of the present disclosure.

The Computer 802 includes an Interface 804. Although illustrated as a single Interface 804, two or more Interfaces 804 can be used according to particular needs, desires, or particular implementations of the Computer 802. The Interface 804 is used by the Computer 802 for communicating with another computing system (whether illustrated or not) that is communicatively linked to the Network 830 in a distributed environment. Generally, the Interface 804 is operable to communicate with the Network 830 and includes logic encoded in software, hardware, or a combination of software and hardware. More specifically, the Interface 804 can include software supporting one or more communication protocols associated with communications such that the Network 830 or hardware of Interface 804 is operable to communicate physical signals within and outside of the illustrated Computer 802.

The Computer 802 includes a Processor 805. Although illustrated as a single Processor 805, two or more Processors 805 can be used according to particular needs, desires, or particular implementations of the Computer 802. Generally, the Processor 805 executes instructions and manipulates data to perform the operations of the Computer 802 and any algorithms, methods, functions, processes, flows, and procedures as described in the present disclosure.

The Computer 802 also includes a Database 806 that can hold data for the Computer 802, another component communicatively linked to the Network 830 (whether illustrated or not), or a combination of the Computer 802 and another component. For example, Database 806 can be an in-memory, conventional, or another type of database storing data consistent with the present disclosure. In some implementations, Database 806 can be a combination of two or more different database types (for example, a hybrid in-memory and conventional database) according to particular needs, desires, or particular implementations of the Computer 802 and the described functionality. Although illustrated as a single Database 806, two or more databases of similar or differing types can be used according to particular needs, desires, or particular implementations of the Computer 802 and the described functionality. While Database 806 is illustrated as an integral component of the Computer 802, in alternative implementations, Database 806 can be external to the Computer 802.

The Computer 802 also includes a Memory 807 that can hold data for the Computer 802, another component or components communicatively linked to the Network 830 (whether illustrated or not), or a combination of the Computer 802 and another component. Memory 807 can store any data consistent with the present disclosure. In some implementations, Memory 807 can be a combination of two or more different types of memory (for example, a combination of semiconductor and magnetic storage) according to particular needs, desires, or particular implementations of the Computer 802 and the described functionality. Although illustrated as a single Memory 807, two or more Memories 807 or similar or differing types can be used according to particular needs, desires, or particular implementations of the Computer 802 and the described functionality. While Memory 807 is illustrated as an integral component of the Computer 802, in alternative implementations, Memory 807 can be external to the Computer 802.

The application 808 is an algorithmic software engine providing functionality according to particular needs, desires, or particular implementations of the Computer 802, particularly with respect to functionality described in the present disclosure. For example, application 808 can serve as one or more components, modules, or applications. Further, although illustrated as a single application 808, the application 808 can be implemented as multiple applications 808 on the Computer 802. In addition, although illustrated as integral to the Computer 802, in alternative implementations, the application 808 can be external to the Computer 802.

The Computer 802 can also include a Power Supply 814. The Power Supply 814 can include a rechargeable or non-rechargeable battery that can be configured to be either user- or non-user-replaceable. In some implementations, the Power Supply 814 can include power-conversion or management circuits (including recharging, standby, or another power management functionality). In some implementations, the Power Supply 814 can include a power plug to allow the Computer 802 to be plugged into a wall socket or another power source to, for example, power the Computer 802 or recharge a rechargeable battery.

There can be any number of Computers 802 associated with, or external to, a computer system containing Computer 802, each Computer 802 communicating over Network 830. Further, the term "client," "user," or other appropriate terminology can be used interchangeably, as appropriate, without departing from the scope of the present disclosure. Moreover, the present disclosure contemplates that many users can use one Computer 802, or that one user can use multiple computers 802.

Described implementations of the subject matter can include one or more features, alone or in combination.

For example, in a first implementation, a computer-implemented method, comprising: receiving a request at a service manager from a service broker proxy or a service manager aware service registry to create a service instance; requesting creation of a service instance from a service broker; storing details of the created service instance within the service manager; and returning a success or failure status to the service broker proxy.

The foregoing and other described implementations can each, optionally, include one or more of the following features:

A first feature, combinable with any of the following features, comprising tracking and storing all service instances using the service manager, including in which environments all service instances are used.

A second feature, combinable with any of the previous or following features, comprising generating a service instance identification (ID) based on the received request.

A third feature, combinable with any of the previous or following features, comprising creating a service instance with the service broker.

A fourth feature, combinable with any of the previous or following features, wherein the communication between the service broker and the service instance is service specific.

A fifth feature, combinable with any of the previous or following features, comprising, for services that allow service instance sharing, adding a service plan to a service catalog of the service broker using the service manager.

A sixth feature, combinable with any of the previous or following features, comprising: identifying, with the service manager and from a received parameter, the environment of a new service instance; and mapping, using the parameter, all requests to the new service instance to the service instance.

In a second implementation, a non-transitory, computer-readable medium storing one or more instructions executable by a computer system to perform operations comprising: receiving a request at a service manager from a service broker proxy or a service manager aware service registry to create a service instance; requesting creation of a service instance from a service broker; storing details of the created service instance within the service manager; and returning a success or failure status to the service broker proxy.

The foregoing and other described implementations can each, optionally, include one or more of the following features:

A first feature, combinable with any of the following features, comprising tracking and storing all service instances using the service manager, including in which environments all service instances are used.

A second feature, combinable with any of the previous or following features, comprising generating a service instance identification (ID) based on the received request.

A third feature, combinable with any of the previous or following features, comprising creating a service instance with the service broker.

A fourth feature, combinable with any of the previous or following features, wherein the communication between the service broker and the service instance is service specific.

A fifth feature, combinable with any of the previous or following features, comprising, for services that allow service instance sharing, adding a service plan to a service catalog of the service broker using the service manager.

A sixth feature, combinable with any of the previous or following features, comprising: identifying, by the service manager and from a received parameter, the environment of a new service instance; and mapping, using the parameter, all requests to the new service instance to the service instance.

In a third implementation, a computer-implemented system, comprising: a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving a request at a service manager from a service broker proxy or a service manager aware service registry to create a service instance; requesting creation of a service instance from a service broker; storing details of the created service instance within the service manager; and returning a success or failure status to the service broker proxy.

The foregoing and other described implementations can each, optionally, include one or more of the following features:

A first feature, combinable with any of the following features, comprising tracking and storing all service instances using the service manager, including in which environments all service instances are used.

A second feature, combinable with any of the previous or following features, comprising generating a service instance identification (ID) based on the received request.

A third feature, combinable with any of the previous or following features, comprising creating a service instance with the service broker.

A fourth feature, combinable with any of the previous or following features, wherein the communication between the service broker and the service instance is service specific.

A fifth feature, combinable with any of the previous or following features, comprising, for services that allow service instance sharing, adding a service plan to a service catalog of the service broker using the service manager.

A sixth feature, combinable with any of the previous or following features, comprising: identifying, by the service manager and from a received parameter, the environment of a new service instance; and mapping, using the parameter, all requests to the new service instance to the service instance.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client-computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving a request at a service manager from a service broker proxy or a service manager aware service registry to create a service instance;
   requesting creation of a service instance from a service broker;
   storing details of the created service instance within the service manager;
   returning a success or failure status to the service broker proxy; and
   for services that allow service instance sharing:
      adding a service plan to a service catalog of the service broker using the service manager;
      identifying, by the service manager and from a received parameter, the environment of a new service instance; and
      mapping, using the parameter, all requests to the new service instance to the service instance.

2. The computer-implemented method of claim 1, comprising tracking and storing all service instances using the service manager, including in which environments all service instances are used.

3. The computer-implemented method of claim 2, comprising generating a service instance identification (ID) based on the received request.

4. The computer-implemented method of claim 1, comprising creating a service instance with the service broker.

5. The computer-implemented method of claim 1, wherein the communication between the service broker and the service instance is service specific.

6. A non-transitory, computer-readable medium storing one or more instructions executable by a computer system to perform operations comprising:
   receiving a request at a service manager from a service broker proxy or a service manager aware service registry to create a service instance;
   requesting creation of a service instance from a service broker;
   storing details of the created service instance within the service manager;
   returning a success or failure status to the service broker proxy; and
   for services that allow service instance sharing;
      adding a service plan to a service catalog of the service broker using the service manager;
      identifying, by the service manager and from a received parameter, the environment of a new service instance; and
      mapping, using the parameter, all requests to the new service instance to the service instance.

7. The non-transitory, computer-readable medium of claim 6, comprising tracking and storing all service instances using the service manager, including in which environments all service instances are used.

8. The non-transitory, computer-readable medium of claim 7, comprising generating a service instance identification (ID) based on the received request.

9. The non-transitory, computer-readable medium of claim 6, comprising creating a service instance with the service broker.

10. The non-transitory, computer-readable medium of claim 6, wherein the communication between the service broker and the service instance is service specific.

11. A computer-implemented system, comprising:
    one or more computers; and
    one or more computer memory devices interoperably coupled with the one or more computers and having tangible; non-transitory, machine-readable media storing one or more instructions that, when executed by the one or more computers, perform one or more operations comprising:
       receiving a request at a service manager from a service broker proxy or a service manager aware service registry to create a service instance;
       requesting creation of a service instance from a service broker;
       storing details of the created service instance within the service manager;
       returning a success or failure status to the service broker proxy; and
       for services that allow service instance sharing:
          adding a service plan to a service catalog of the service broker using, the service manger;

identifying, by the service manager and from a received parameter, the environment of a new service instance; and mapping, using the parameter, all requests to the new service instance to the service instance.

12. The computer-implemented system of claim 11, comprising tracking and storing all service instances using the service manager, including in which environments all service instances are used.

13. The computer-implemented system of claim 12, comprising generating a service instance identification (ID) based on the received request.

14. The computer-implemented system of claim 11, comprising creating a service instance with the service broker.

15. The computer-implemented system of claim 11, wherein the communication between the service broker and the service instance is service specific.

* * * * *